United States Patent
Yan et al.

(10) Patent No.: US 10,838,777 B2
(45) Date of Patent: Nov. 17, 2020

(54) DISTRIBUTED RESOURCE ALLOCATION METHOD, ALLOCATION NODE, AND ACCESS NODE

(71) Applicant: TENCENT TECHNOLOGY (SHENZHEN) COMPANY LIMITED, Shenzhen (CN)

(72) Inventors: Kezhou Yan, Shenzhen (CN); Yaqing Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 65 days.

(21) Appl. No.: 16/201,606

(22) Filed: Nov. 27, 2018

(65) Prior Publication Data
US 2019/0108069 A1   Apr. 11, 2019

Related U.S. Application Data

(63) Continuation of application No. PCT/CN2017/103606, filed on Sep. 27, 2017.

(30) Foreign Application Priority Data

Sep. 30, 2016   (CN) .......................... 2016 1 0874061

(51) Int. Cl.
*G06F 9/50* (2006.01)
*G06F 9/54* (2006.01)

(52) U.S. Cl.
CPC .............. *G06F 9/5083* (2013.01); *G06F 9/50* (2013.01); *G06F 9/5038* (2013.01); *G06F 9/54* (2013.01);
(Continued)

(58) Field of Classification Search
CPC ...... G06F 3/126; G06F 3/1296; G06F 9/5038; G06F 9/546; G06F 9/54; G06F 9/50
See application file for complete search history.

(56) References Cited

U.S. PATENT DOCUMENTS 4,325,120 A * 4/1982 Colley ................... G06F 9/546
711/202
4,387,427 A * 6/1983 Cox ........................ G06F 9/468
718/102
(Continued)

FOREIGN PATENT DOCUMENTS

CN   101957780 A   1/2011
CN   102073546 A   5/2011
(Continued)

OTHER PUBLICATIONS

The World Intellectual Property Organization (WIPO) International Search Report for PCT/CN2017/103606 dated Dec. 29, 2017 5 Pages (including translation).

*Primary Examiner* — Phillip H Nguyen
(74) *Attorney, Agent, or Firm* — Anova Law Group, PLLC

(57) ABSTRACT

This application discloses a resource allocation method, an allocation node, and an access node. The method includes: receiving a service request message sent by an access node, the service request message from the access node indicating a to-be-processed service in the access node, and obtaining work queue status information of a resource node. The method further includes allocating, according to the service request message and the work queue status information, the to-be-processed service to a resource node; receiving allocation, by the access node, of a resource node for the to-be-processed service and generating an allocation result; and sending the allocation result to the access node. The
(Continued)

access node further sends a task request to the allocated resource node according to the allocation result.

17 Claims, 6 Drawing Sheets

(52) U.S. Cl.
CPC ........ G06F 9/546 (2013.01); *G06F 2209/548* (2013.01)

(56) References Cited

U.S. PATENT DOCUMENTS

| | | | | |
|---|---|---|---|---|
| 5,787,304 A | * | 7/1998 | Hodges | G06F 13/1642 710/1 |
| 6,213,652 B1 | * | 4/2001 | Suzuki | G06F 3/1204 358/1.15 |
| 9,377,979 B1 | * | 6/2016 | Hansen | G06F 3/1203 |
| 10,073,714 B2 | * | 9/2018 | Rimoni | G06F 3/0679 |
| 2011/0205586 A1 | * | 8/2011 | Takahashi | G06F 9/5027 358/1.15 |
| 2012/0086978 A1 | * | 4/2012 | Uchikawa | G06F 3/1212 358/1.15 |
| 2012/0212771 A1 | * | 8/2012 | Goddard | G06F 3/1204 358/1.15 |
| 2015/0331628 A1 | * | 11/2015 | Lee | G06F 12/1009 711/103 |
| 2019/0243688 A1 | * | 8/2019 | Karmarkar | G06F 9/5011 |

FOREIGN PATENT DOCUMENTS

| | | |
|---|---|---|
| CN | 103699445 A | 4/2014 |
| CN | 104363300 A | 2/2015 |
| CN | 104657214 A | 5/2015 |

* cited by examiner

DISTRIBUTED RESOURCE ALLOCATION METHOD, ALLOCATION NODE, AND ACCESS NODE

RELATED APPLICATION

This application claims priority to PCT Application No. PCT/CN2017/103606 filed on Sep. 27, 2018, which claims Chinese Patent Application No. 201610874061.X, filed with the Chinese Patent Office on Sep. 30, 2016 and entitled "DISTRIBUTED RESOURCE ALLOCATION METHOD, ALLOCATION NODE, AND ACCESS NODE." The two applications are incorporated herein by reference in their entirety.

FIELD OF THE TECHNOLOGY

This application relates to the computer processing field, and in particular, to a distributed resource allocation method, an allocation node, and an access node.

BACKGROUND OF THE DISCLOSURE

In a distributed computing environment, the computing system often divides a complex task or application into a plurality of small tasks which are then allocated to a plurality of computers for parallel processing. When performing resource allocation according to a received request, an allocation node identifies a resource node among a plurality of resource nodes, which would then process the request.

SUMMARY

In view of this, embodiments of the present disclosure provide a resource allocation method for a distributed computing environment, an allocation node, and an access node. Embodiments of the present disclosure improve efficiency of resource allocation by the allocation node and resource utilization of a resource node.

The technical solutions of the embodiments of this application are implemented as follows.

One aspect of the present disclosure provides a resource allocation method. The method includes: receiving a service request message sent by an access node, the service request message from the access node indicating a to-be-processed service in the access node, and obtaining work queue status information of a resource node. The method further includes allocating, according to the service request message and the work queue status information, the to-be-processed service to a resource node; receiving allocation, by the access node, of a resource node for the to-be-processed service and generating an allocation result; and sending the allocation result to the access node. The access node further sends a task request to the allocated resource node according to the allocation result.

Another aspect of the present disclosure further provides a resource allocation method. The method includes: receiving, by an access node, a task request for a to-be-processed service, and selecting, by the access node, an allocation node from a group of allocation nodes. The method further includes sending, by the access node, a service request message indicating the to-be-processed service to the allocation node, and receiving, by the access node, an allocation result from the allocation node, the allocation result indicating a resource node identified by the allocation node for the to-be-processed service according to the service request message and a work queue status information of the resource node. The method further includes sending a task request to the at least one allocated resource node according to the allocation result.

Another aspect of the present disclosure further provides an allocation node, including a processor and a memory, the memory storing instructions that can be executed by the processor, and when executing the instructions, the processor being configured to: receive a service request message sent by at least one access node, the service request message from an access node indicating at least one to-be-processed service in the access node; and obtain work queue status information of at least one resource node. The processor is further configured to identify at least one resource node for each to-be-processed service in the access node; generate an allocation result based on resource allocation according to the service request message and the work queue status information; and send the allocation result to the access node, the access node sending at least one task request to the allocated resource node according to the allocation result.

BRIEF DESCRIPTION OF THE DRAWINGS

To illustrate the technical solutions in the embodiments of the present disclosure, the following briefly describes the accompanying drawings required for describing the embodiments. Apparently, the accompanying drawings in the following description merely show some embodiments of the present disclosure, and a person of ordinary skill in the art can derive other drawings from these accompanying drawings without creative efforts.

DESCRIPTION OF EMBODIMENTS

In a distributed computing environment, applying an existing resource allocation method, an allocation node can identify a corresponding resource node for each request by estimating a processing capability of each resource node in advance. If the estimate on the processing capability of the resource node is not accurate enough, resource allocation of an entire system may be improper, and a request would not be allocated needed resources according to a real capability of the resource node. In addition, when a processing time required by each request is different and cannot be known in advance, the load of processing the request by the resource node can easily be not balanced. Therefore, resource allocation of the resource nodes can be improper, consequentially, resource utilization rate may be reduced.

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
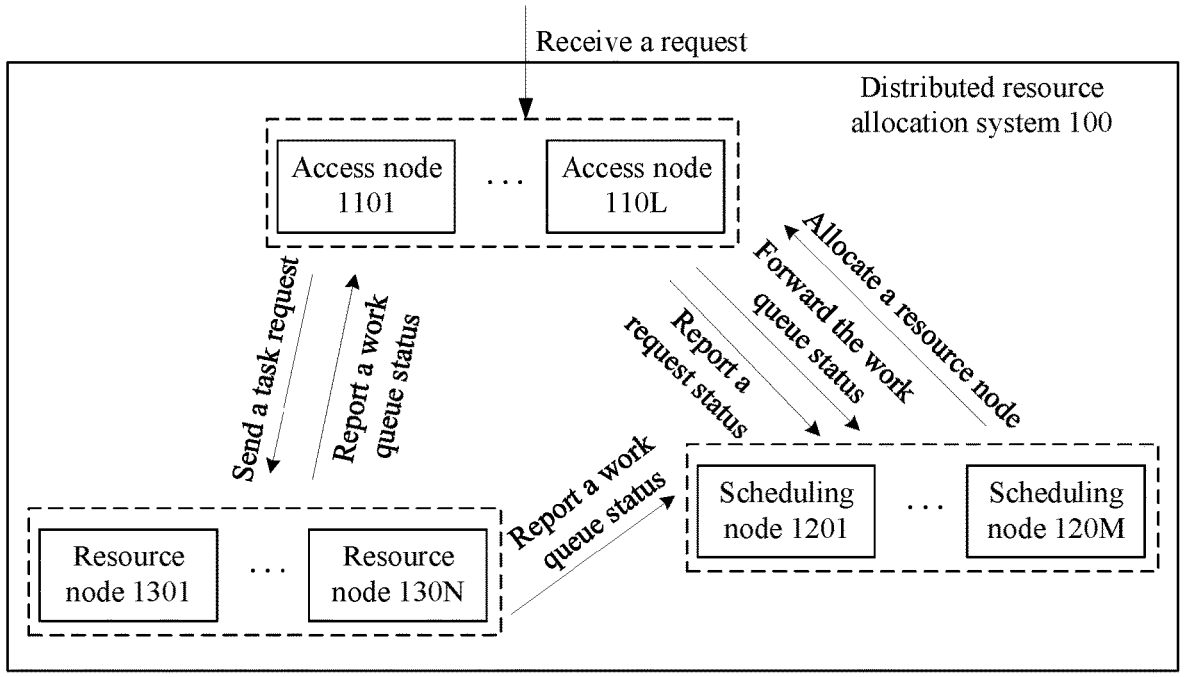
FIG. 1 is a schematic structural diagram of a distributed resource allocation system related in an embodiment of the present disclosure.

FIG. 1 is a schematic structural diagram of a distributed resource allocation system related in an embodiment of the present disclosure. Referring to FIG. 1, the distributed resource allocation system 100 includes: access nodes 1101-110L, allocation nodes 1201-120M, and resource nodes 1301-130N. There are L access nodes, M allocation nodes, and N resource nodes. Usually, N is much greater than L.

The distributed resource allocation system 100 is used for performing distributed computing and processing a large-scale calculation task, for example, performing transcoding processing on a large video file. The three types of nodes included respectively have different functions. Specifically, the access nodes 1101-110L are responsible for receiving a task request corresponding to a service from an upper layer, reporting a status of a request in each service to the allocation nodes 1201-120M to apply for a resource, and controlling execution of the request with the resource nodes. In addition, the access nodes 1101-110L may further forward work queue status information of the resource nodes 1301-130N to the allocation nodes 1201-120M.

The allocation nodes 1201-120M are responsible for maintaining the work queue status information of the resource nodes by interacting with the access nodes 1101-110L and/or the resource nodes 1301-130N, and allocating resource nodes to the access nodes 1101-110L according to the status of the request reported by the access nodes.

The resource nodes 1301-130N are responsible for processing the task requests sent by the access nodes, and reporting the work queue status information of the resource nodes to the access nodes 1101-110L and the allocation nodes 1201-120M.

Figure 2:
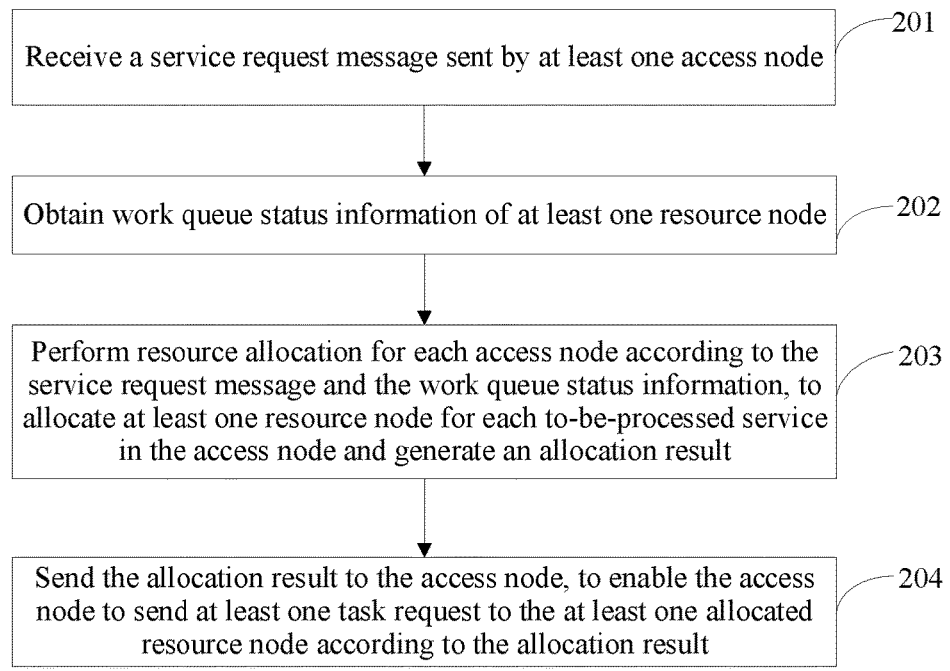
FIG. 2 is a schematic flowchart of a resource allocation method according to an embodiment of the present disclosure.

FIG. 2 is a schematic flowchart of a resource allocation method according to an embodiment of the present disclosure. The method is applied to an allocation node. Referring to FIG. 2, the method includes the following steps.

Step S201: Receive a service request message sent by at least one access node.

The service request message from an access node indicates at least one to-be-processed service in the access node. Specifically, each access node receives task requests of various services from an upper-layer service management unit, and maintains a request queue with a plurality of services. The task request is used for instructing to request to process a task for a certain service. Whenever a task request for a service is received, the access node writes the task request into a request queue of the service. The service request message carries a number of task requests in the request queue of each service in the access node. The service request message may also be referred to as a queue report packet used for reporting, by the access node, a current status of a request in each service to an allocation node.

The access nodes may send the service request messages at different time points. In this way, the allocation nodes can learn a current number of requests in the request queue of each service in each access node. The allocation node maintains a service request list according to the received service request message of each access node. The list stores an access node identifier (ID), each service ID, and the number of task requests in the request queue.

Table 1 shows an example of a service request list. There are L access nodes in total, and each access node includes a plurality of services. For example, a $l^{th}$ access node includes Sl services, where l=1, . . . , L. For example, when the access node ID=1, there are $S_1$ services in total, and the number of task requests in the request queue of each service may be different. For example, when the service ID=11, the number of task requests in the request queue is 1; and if the service ID=1$S_1$, the number of task requests in the request queue is 0, that is, no task request is received currently. The access node ID may alternatively be represented by an IP address of the access node.

TABLE 1

Service request list

| Access node ID | Service ID | Priority P | Number of task requests in a request queue |
|---|---|---|---|
| 1 | 11 | 0 | 1 |
|   | 12 | 1 | 2 |
|   | ... | ... | ... |
|   | 1$S_1$ | 3 | 0 |
| 2 | 21 | 0 | 3 |
|   | 22 | 0 | 2 |
|   | ... | ... | ... |
|   | 2$S_2$ | 1 | 3 |
| ... | ... | ... | ... |
| L | L1 | 1 | 1 |
|   | L2 | 1 | 2 |
|   | ... | ... | ... |
|   | L$S_L$ | 1 | 3 |

Step S202: Obtain work queue status information of at least one resource node.

The allocation node may obtain the work queue status information of at least one resource node in the following two methods.

Method No. (1): Obtain the work queue status information of at least one resource node from the resource node.

The allocation node sends a status monitoring message to each resource node at a predetermined time interval, and then receives a status monitoring acknowledgement message fed back by each resource node, the status monitoring acknowledgement message carrying the work queue status information of the resource node.

For example, the status monitoring message is a heartbeat packet, and the allocation node periodically sends the heartbeat packet to each resource node. For example, the predetermined time interval is 3 seconds. After receiving the heartbeat packet sent by the allocation node, the resource node returns a heartbeat acknowledgement (ACK) packet (that is, the status monitoring acknowledgement message) to the allocation node, generates in real time current work queue status information of the resource node, and then returns the work queue status information to the allocation node by adding the work queue status information into the heartbeat ACK packet.

Method No. (2): Obtain the work queue status information of at least one resource node from the access node.

The allocation node receives a status monitoring message sent by each access node, the status monitoring message carrying the work queue status information of at least one resource node that is obtained by the access node. When exchanging a task request with a resource node, the access node may obtain current work queue status information of the resource node. When sending the status monitoring message to the allocation node, the access node then is added with the work queue status information of the at least one resource node that is obtained by the access node. In this case, the status monitoring message may also be a heartbeat packet.

In this embodiment of the present disclosure, each resource node establishes a work queue according to the to-be-processed task requests received from the access node, the work queue includes a task request that is being processed by the resource node, and a so-called length of the work queue refers to the number of the task requests that are being processed by the resource node.

Specifically, the work queue status information includes a time stamp $t_k$ when a $k^{th}$ resource node generates the work queue status information and a length $q_k$ of a work queue of the resource node, where k=1, . . . , K. The allocation node records the received work queue status information of each resource node, for example, by establishing a work queue status table, and maintains the work queue status table according to the received work queue status information.

Table 2 is an example of the work queue status table established by an allocation node. There are K resource nodes in total, and work queue status information of each resource node includes a time stamp $t_k$ (including date and time) and a length $q_k$ of a work queue.

TABLE 2

| Work queue status table | | |
|---|---|---|
| Resource node | Work queue status information | |
| ID | Time stamp $t_k$ | Length $q_k$ of a work queue |
| 1 | 2016-08-02 09:15 | 2 |
| 2 | 2016-08-01 17:05 | 0 |
| . . . | . . . | . . . |
| K | 2016-08-02 11:30 | 3 |

Whenever receiving work queue status information of a resource node, the allocation node updates the recorded work queue status information of the resource node according to an order of the time stamp $t_k$. For example, the time stamp in the locally recorded work queue status information of the $k^{th}$ resource node is $t_k$, and the length of the queue is $q_k$. The allocation node receives the work queue status information of the $k^{th}$ resource node again at a certain time point, and the time stamp is $t_g$ and the length of the queue is $q_g$. If $t_k > t_g$, that is, $t_g$ is a relatively most recent time point in a time order, the local work queue status information is updated to make $t_k = t_g$ and $q_k = q_g$; otherwise, updating at this time is given up and a previous record is kept unchanged.

Step S203: Perform resource allocation for each access node according to the service request message and the work queue status information, to identify at least one resource node for each to-be-processed service in the access node and generate an allocation result.

When the allocation node performs resource allocation, the following steps are included:

Step S2031: Determine an idle resource node from the at least one resource node according to the length of the work queue.

Specifically, the allocation node presets a length threshold Q of the work queue of the resource node. If a length of a work queue of a resource node is $q_k < Q$, the resource node is regarded as the idle node; otherwise, the resource node is regarded as a busy node. For example, Q=3.

Step S2032: Preset a priority of each service in the access node.

The allocation node assigns the priority for each service, and locally preconfigures the priority P to which each service belongs. A service with a higher priority first obtains the resource node. For example, P={0, 1, 2, 3}, where 0 represents a highest priority. As shown in Table 1, when the access node ID=1, a priority to which the included service ID=11 belongs is the highest priority 0, and a priority to which the service ID=12 is 1.

Step S2033: Identify at least one idle resource node for each service according to the priority.

Specifically, each service of each access node is sequentially polled according to a descending order of the priority, and at least one idle resource node is allocated to each service.

The service request message carries the number of task requests in a request queue of each service of an access node. The number of task requests of a $j^{th}$ service is $M_j$, where j=1, . . . , J, and J is a total number of the services, and the allocation node identifies $M_j$ idle resource nodes for the $j^{th}$ service when performing resource allocation.

When specifically performing resource allocation, the allocation node sequentially polls all the access nodes to find whether there is a service whose priority is 0. If yes, an idle resource node is allocated for each request in a queue of the service, and a length of a work queue $q_k$ of the allocated resource node is added by 1. Until there is not a service of the highest priority 0 in all the access nodes, the allocation node starts allocating resources for a service whose priority is 1, and the like.

If an access node includes a plurality of services with a same priority, as shown in Table 1, when the access node ID=2, a priority to which the included service ID=21 belongs and a priority to which the included service ID=22 belongs are both the highest priority 0, resource nodes may be allocated during one polling to all the services with the same priority, or a resource node may be only allocated to one of the services during one polling.

If during an allocation process, the allocation node allocated tasks to all the idle resources nodes, resource allocation is then stopped; or if all services of all nodes are assigned with the resource nodes, resource allocation is then stopped.

Steps S204: Send the allocation result to the access node, to enable the access node to send at least one task request to the at least one allocated resource node according to the allocation result.

After completing the resource allocation, the allocation node informs the access node of the allocation result. The allocation result indicates an allocated resource node ID corresponding to each service ID, that is, indicates that which resource nodes are allocated to each service for services of the access node. One request in each service corresponds to one resource node, that is, $M_j$ resource nodes are allocated to the $j^{th}$ service. The access node then takes out a same number of task requests from the corresponding request queue according to the received allocation result, and respectively sends the task requests to the resource nodes given in the allocation result for processing. That is, $M_j$ task requests are taken out from the request queue of the $j^{th}$ service, and one task request is respectively sent to each resource node in the $M_j$ allocated resource nodes. After the resource allocation is completed, in terms of the resource node, one resource node can process a plurality of task requests.

In this embodiment, the service request message sent by at least one access node is received, and the work queue status information of at least one resource node is obtained, so that the allocation process does not need to manage each specific service request and does not need to estimate a processing capability of each resource node in advance. For each access node, resource allocation is performed according to the service request message and the work queue status information, and at least one resource node is allocated for each service of the access node, thereby a situation in which some resource nodes are fully loaded but some resource nodes are with no load may be avoided. Even a processing time required by each service request is different and the processing capability of the resource node is different, a length of the work queue of each resource node may be ensured to be at a same level. When cluster pressure is relatively large, all the resource nodes may be ensured to run with full load, thereby efficiency of resource allocation is improved, and processing efficiency and resource utilization of the allocation node and the resource node are improved.

In a specific scenario, the upper layer service management unit receives task requests of various video transcoding services, and the access node is specifically a video access node used for continuously receiving the task requests for the video transcoding services from the upper layer service management unit, writing the task requests into request queues of the corresponding video transcoding services, and sending a queue report packet to online video allocation nodes (or referred to as video masters) that work normally. The video allocation node obtains work queue status information of a video resource node (or referred to as a video worker), and performs resource allocation with reference to the received queue report packet, to identify a resource node for each video transcoding service.

Figure 3:
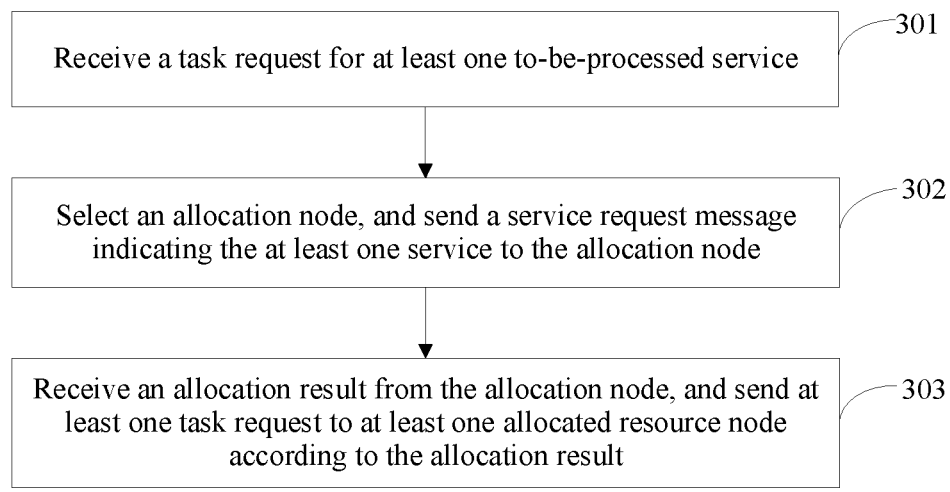
FIG. 3 is a schematic flowchart of a resource allocation method according to another embodiment of the present disclosure.

FIG. 3 is a schematic flowchart of a resource allocation method according to another embodiment of the present disclosure. The method is applied to an access node. Referring to FIG. 3, the method includes the following steps.

Step S301: Receive a task request for at least one to-be-processed service.

In this step, an upper layer service management unit sends the task requests of each service to the access node. The access node generates a request queue of at least one service, and is responsible for maintaining the request queue with a plurality of services. Whenever a task request for a service is received, the task request is written into a request queue of the service. In this way, each service corresponds to one request queue, and each request queue includes one or more task requests. A time point at which each task request arrives is different, and a processing time required by each task request may also be different, for example, several seconds or several minutes.

Step S302: Select an allocation node from a group of allocation node, and send a service request message indicating the at least one service to the allocation node.

In this step, the service request message carries a number of task requests in the request queue of each service. For example, the access node currently receives requests of J services in total, and a number of task requests in a request queue of a $j^{th}$ service is $M_j$, where j=1, . . . , J. In this way, the allocation node may perform resource allocation according to the service request message and obtained work queue status information of at least one resource node, to allocate at least one resource node for each service and generate an allocation result.

In addition, there may be the following two trigger events for triggering the access node to send the service request message.

(1) After receiving a task request and writing the task request into a request queue of a corresponding service, the access node is immediately triggered to send the service request message, that is, to select an allocation node and send the service request message to the allocation node.

(2) The access continuously receives the task request and is triggered to send the service request message according to a predetermined period, for example, to select an allocation node every T seconds and send the service request message to the allocation node.

The foregoing Method No. (2) is applicable to a situation in which the task request arrives too frequently, and reporting according to the period can save a processing load of the access node.

Step S303: Receive an allocation result from the allocation node, and send at least one task request to at least one allocated resource node according to the allocation result.

Corresponding to description of the step S204, the access node takes out a same number of task requests from the request queue of each service according to the allocation result, and respectively sends the task requests to the resource nodes given in the allocation result for processing. That is, $M_j$ task requests are taken out from the request queue of the $j^{th}$ service, and one task request is respectively sent to each resource node in the $M_j$ allocated resource nodes. That is, after the resource allocation is completed, one task request corresponding to one resource node, and one resource can process a plurality task requests.

In the foregoing embodiment, the request queue of at least one service is generated, whenever a task request for a service is received, the task request is written into the request queue of the service, an allocation node is selected from a group of allocation nodes, and the service request message for the request queue is sent to the allocation node. As long as one allocation node is online and can work normally, the access node can send the service request message to the allocation node, and normal resource allocation is performed. There is no need to make requirements on performance of all allocation nodes in a distributed system.

In addition, the allocation node only needs to receive the service request message reported by the access node, and the service request message only carries of a number of task requests in the request queue of each service in the access node. Therefore, the allocation node does not need to manage a specific status of each task request, for example, a time point at which the task request is received or a processing time required by the task request. Thereby, a processing load of the allocation node is reduced, a fault rate of the allocation node is reduced, and resource utilization of the allocation node is improved.

Figure 4:
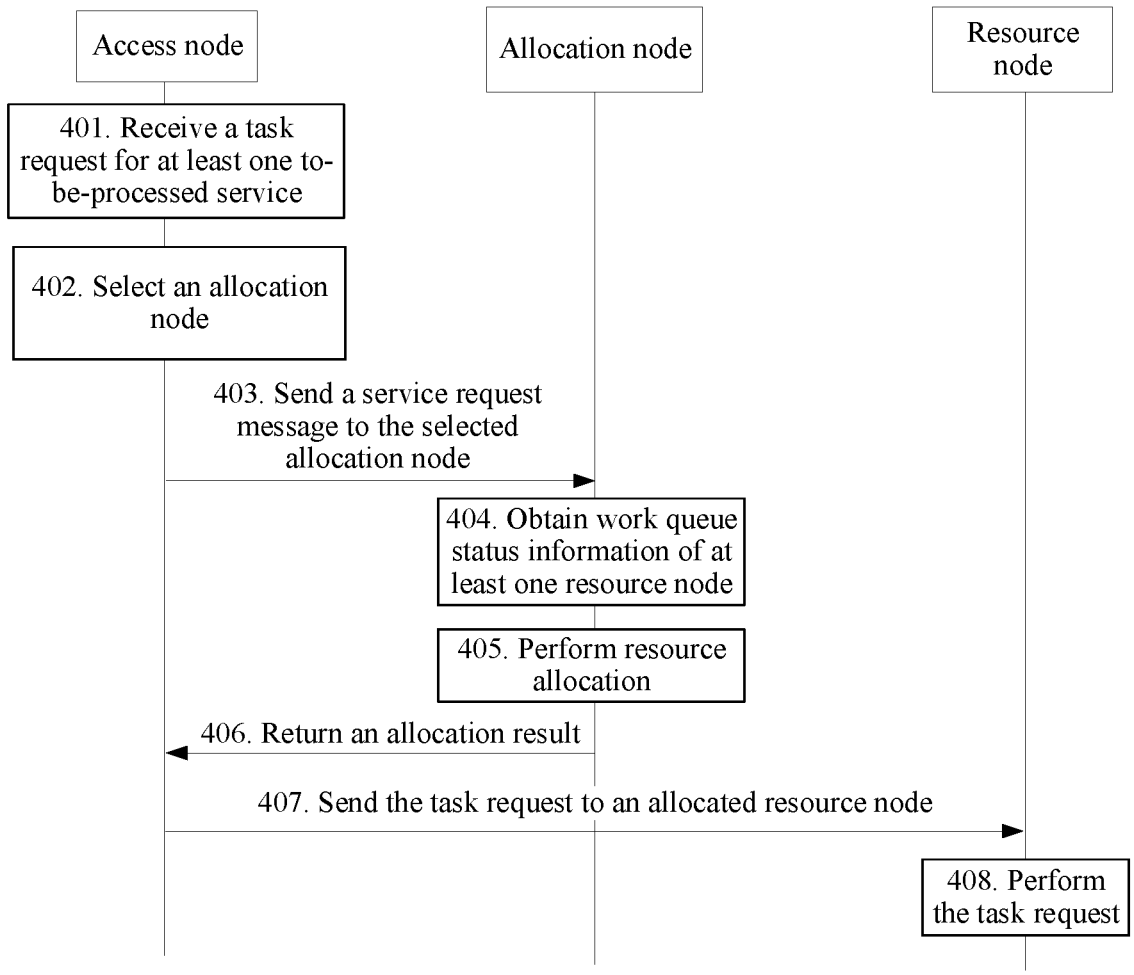
FIG. 4 is a schematic interactive diagram of a resource allocation method according to an embodiment of the present disclosure.

FIG. 4 is a schematic interactive diagram of a resource allocation method according to an embodiment of the present disclosure. An access node is used as an example, and interaction between the access node, at least one allocation node and at least one resource node is included. As shown in the FIG. 4, the method includes the following steps.

Step S401: The access node receives a task request for at least one to-be-processed service.

Step S402: The access node selects an allocation node from a group of allocation nodes.

Step S403: The access node sends a service request message for a request queue to the selected allocation node.

During specific execution, the step S403 is an intermediate step for implementing the step S402, and the two steps are synchronically completed. That is, in a process of selecting the allocation node, the service request message is sent to the allocation node. Specifically, refer to the embodiment shown in FIG. 5.

Step S404: Each allocation node obtains work queue status information of at least one resource node.

Step S405: Each allocation node performs resource allocation according to the received service request message and the work queue status information of at least one resource node, to identify at least one resource node for each service of each access node and generate an allocation result.

Step S406: The allocation node returns the corresponding allocation result to the access node.

Step S407: The access node sends the task request to the allocated resource node.

Step S408: The allocated resource node performs corresponding processing according to the received task request.

Figure 5:
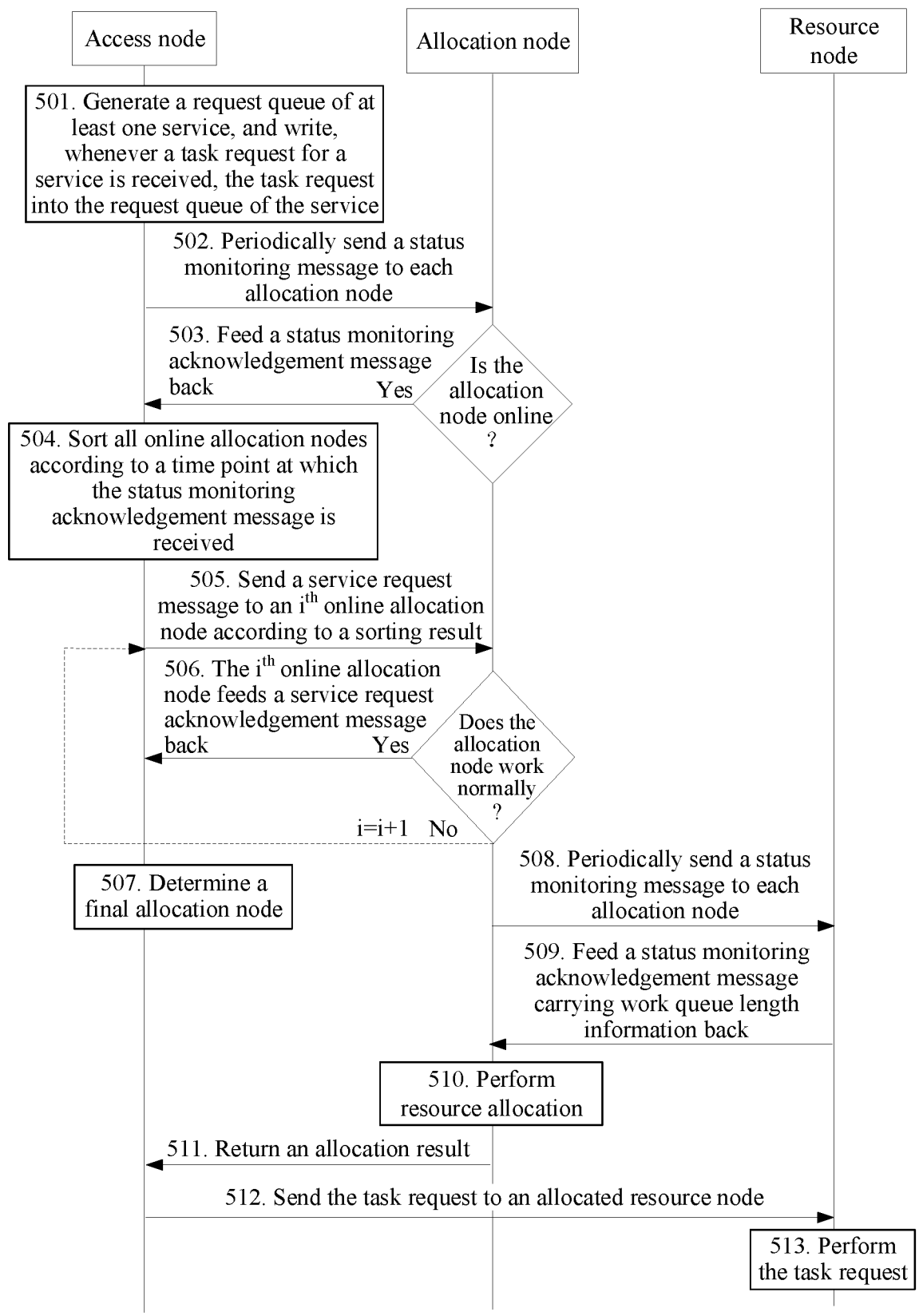
FIG. 5 is a schematic interactive diagram of a resource allocation method according to another embodiment of the present disclosure.

FIG. 5 is a schematic interactive diagram of a resource allocation method according to another embodiment of the present disclosure, and shows a specific implementation for the step S402 and the step S403. As shown in the FIG. 5, the method includes the following steps.

Step S501: An access node generates a request queue of at least one service, and writes, whenever receiving a task request for a service, the task request into the request queue of the service.

Step S502: The access node sends a status monitoring message to each allocation node at a predetermined time interval.

In this step, the access node preconfigures IP addresses of all the allocation nodes, and the status monitoring message may be a heartbeat packet. The access node periodically sends the heartbeat packet to each allocation node. For example, the predetermined time interval is T seconds.

Step S503: An online allocation node sends a status monitoring acknowledgement message back to the access node.

For example, the online allocation node immediately replies to the access node with a heartbeat ACK packet after receiving the heartbeat packet sent by the access node.

Step S504: The access node determines that the allocation node is online according to the received status monitoring acknowledgement message, and sorts all online allocation nodes based on a time order according to a time point at which the status monitoring acknowledgement message is received.

A service request message is then sequentially sent to each online allocation node according to a sorting result, and whether a service request acknowledgement message fed back by the online allocation node is received is simultaneously monitored. That is, the step S505 and the step S506 are cyclically performed according to whether the online allocation node can work normally, and are stopped until the service request acknowledgement message fed back by an allocation node is received.

Step S505: Send a service request message to an $i^{th}$ online allocation node according to a sorting result.

Herein, an initial value of i is 1. That is, the access node first selects a first online allocation node and sends the service request message, or referred to as a queue report packet, to the first online allocation node.

Step S506: The $i^{th}$ online allocation node that works normally sends a service request acknowledgement message back to the access node.

The $i^{th}$ allocation node, if working normally, immediately replies to the access node with a queue report packet ACK packet, that is, the service request acknowledgement message after receiving the queue report packet sent by the access node.

If the access node does not receive the queue report packet ACK packet sent by the first online allocation node, it is regarded that the online allocation node cannot work normally or is fault, then i=i+1, and the queue report packet is sent to a second online allocation node, and the like.

Step S507: The access node determines a final allocation node according to the service request acknowledgement message.

When first receiving a queue report packet ACK packet sent by an online allocation node, the access node determines the allocation node as the selected allocation node, and receives an allocation result from the allocation node.

If all the allocation nodes are not online or do not reply with the queue report packet ACK packet, the access node gives up an allocation request at this time.

Step S508: Each allocation node sends a status monitoring message to each resource node at the predetermined time interval.

Step S509: Each resource node sends a status monitoring acknowledgement message back to the corresponding allocation node, the status monitoring acknowledgement message carrying work queue status information of the resource node.

As described in Method No. (1) in the step S202, the allocation node periodically sends the heartbeat packet to the resource node, and obtains the work queue status information of the resource node by receiving the fed back heartbeat ACK packet.

The step S508 and the step S509 may be synchronically performed with the step S501 to the step S506.

Step S510: The allocation node performs resource allocation according to the received service request message and the work queue status information of each resource node, to identify at least one resource node for each service of each access node and generate an allocation result.

Step S511: The allocation node returns the corresponding allocation result to the access node that sends the service request message.

Step S512: The access node sends the task request to the allocated resource node.

Step S513: The allocated resource node performs corresponding processing according to the received task request.

Figure 6:
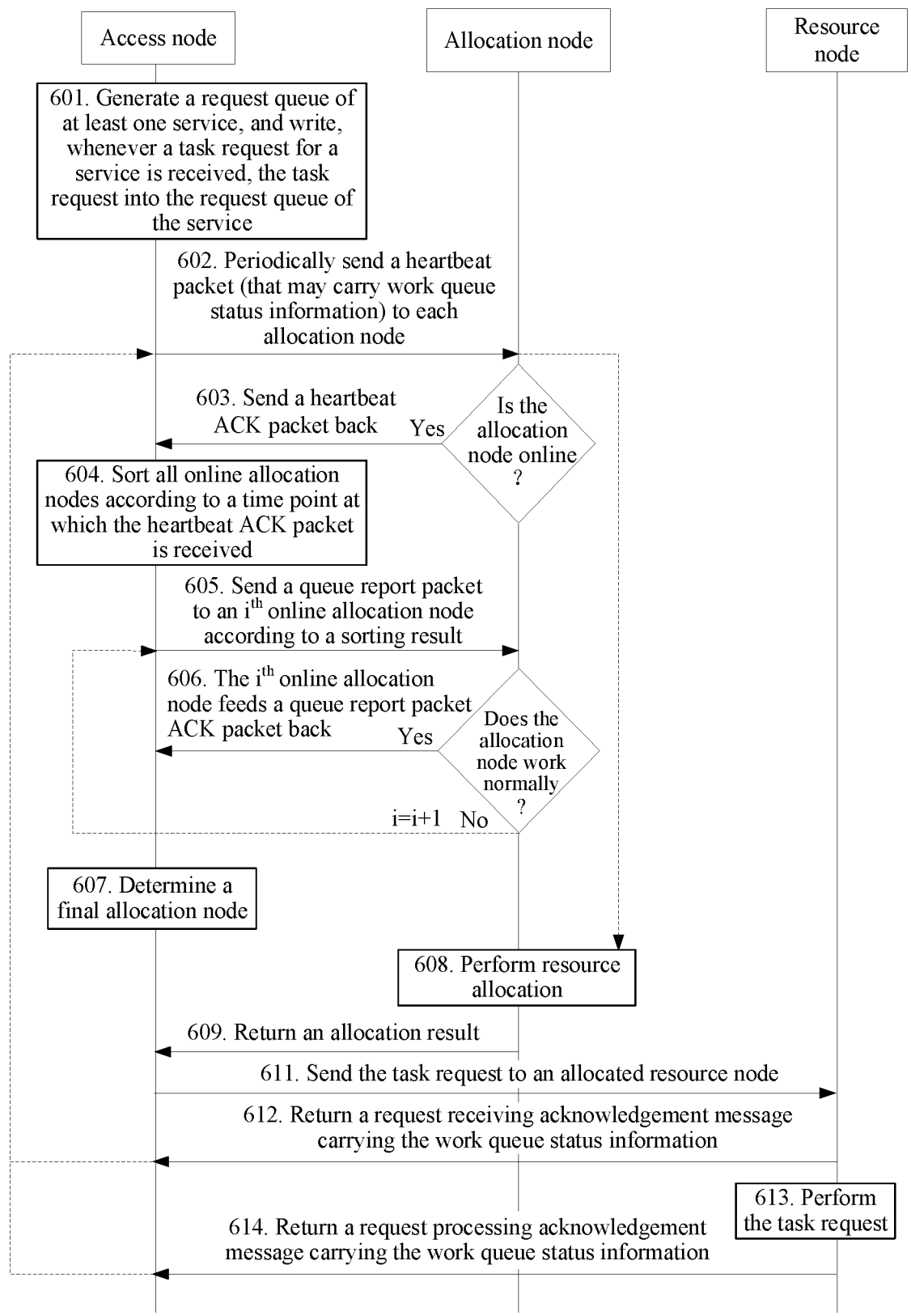
FIG. 6 is a schematic interactive diagram of a resource allocation method according to still another embodiment of the present disclosure.

FIG. 6 is a schematic interactive diagram of a resource allocation method according to still another embodiment of the present disclosure. As described in Method No. (2) in the step S202, the allocation node may also obtain the work queue status information of at least one resource node from the access node. As shown in FIG. 6, the method includes the following steps.

Step S601: An access node generates a request queue of at least one service, and writes, whenever receiving a task request for a service, the task request into the request queue of the service.

Step S602: The access node periodically and respectively sends a heartbeat packet to each allocation node.

In an embodiment, after receiving work queue status information fed back by a resource node (refer to step S612 and/or step S614), the access node adds the work queue status information of the resource node obtained by the access node in a certain time interval into the heartbeat packet. After completing sending, the access node empties the locally stored work queue status information of the resource node.

In addition, after receiving the heartbeat packet that is sent by the access node and that carries the work queue status information, the allocation node may trigger to perform step S608.

Step S603: An online allocation node sends a heartbeat ACK packet back to the access node.

Step S604: The access node determines that the allocation node is online according to the received heartbeat ACK packet, and sorts all online allocation nodes based on a time order according to a time point at which the heartbeat ACK packet is received.

A queue report packet is then sequentially sent to each online allocation node according to a sorting result, and whether a queue report packet ACK packet fed back by the online allocation node is received is simultaneously monitored.

Step S605: Send a queue report packet to an $i^{th}$ online allocation node according to a sorting result.

Step S606: The $i^{th}$ online allocation node that works normally sends a queue report packet ACK packet back to the access node.

If the $i^{th}$ online allocation node cannot work normally or is fault, i=i+1, and the queue report packet is sent to a next online allocation node, and the like, until the queue report packet ACK packet fed back by an allocation node is received.

Step S607: The access node determines a final allocation node according to the received queue report packet ACK packet.

If all the allocation nodes are not online or do not reply with the queue report packet ACK packet, the access node gives up an allocation request at this time.

Step S608: The allocation node performs resource allocation according to the received queue report packet and the work queue status information of each resource node, and identifies at least one resource node for each service of each access node and generates an allocation result.

Step S609: The allocation node returns the corresponding allocation result to the access node that sends the service request message.

Step S611: The access node sends the task request to the allocated resource node.

Step S612: The allocated resource node returns, before processing the received task request, a request receiving acknowledgement message carrying the work queue status information of the resource node to the access node.

The request receiving acknowledgement message is used for instructing to acknowledge that a task request is received.

Step S613: The allocated resource node performs corresponding processing according to the received task request.

Step S614: The allocated resource node returns, after completing processing the received task request, a request processing acknowledgement message carrying the work queue status information of the resource node to the access node.

The request processing acknowledgement message is used for instructing to acknowledge that the received task request is processed.

In the foregoing embodiment, the resource node may report the work queue status information to the access node at two time points:

One is before processing the received task request, as described in the step S612. A time stamp is a time point at which the task request is received and has not been processed. In this case, a length of a work queue is a current length $q_k+1$.

The other one is after completing processing the received task request, as described in the step S614. A time stamp is a time point at which the processing is completed. In this case, a length of a work queue is a current length $q_k-1$.

Further, the work queue status information reported at the two time points is different, reflects different work states of the resource node, and may be used for resource allocation after being forwarded by the access node to the allocation node.

In addition, in the foregoing embodiment, there are two events for triggering the allocation node to perform resource allocation:

One is, for example, that after the step S602, when periodically sending the heartbeat packet, the access node adds the obtained work queue status information of the resource node into the heartbeat packet to send to the allocation node. This indicates that a status of the work queue of the resource node may be changed, and the allocation node may start the resource allocation.

The other one is, for example, that after the step S607, the allocation node receives the queue report packet sent by the access node. This indicates that a new task request arrives, and the allocation node may also start the resource allocation.

It is apparent that the two events respectively may indicate a work status of the resource node and a request status of the access node, and both can trigger the allocation node to reperform resource allocation, to fully utilize idle resource nodes and meet a new task request.

Figure 7:
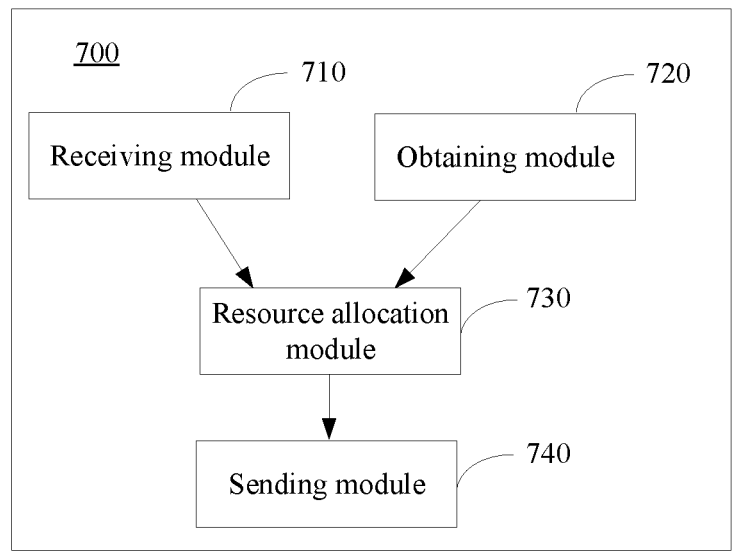
FIG. 7 is a schematic structural diagram of an allocation node according to an embodiment of the present disclosure.

FIG. 7 is a schematic structural diagram of an allocation node according to an embodiment of the present disclosure. As shown in FIG. 7, the allocation node 700 includes the following modules. A receiving module 710, which is configured to receive a service request message sent by at least one access node, the service request message from an access node indicating at least one to-be-processed service in the access node; an obtaining module 720, which is configured to obtain work queue status information of at least one resource node; a resource allocation module 730, which is configured to: perform, for each access node, resource allocation according to the service request message received by the receiving module 710 and the work queue status information obtained by the obtaining module 720, to identify at least one resource node for each to-be-processed service in the access node and generate an allocation result. A sending module 740, which is configured to send, for each access node, the allocation result obtained by the resource allocation module 730 to the access node, to enable the access node to send at least one task request to the at least one allocated resource node according to the allocation result.

In an embodiment, the receiving module 710 is further configured to receive a status monitoring message from each access node at a predetermined time interval. The sending module 740 is further configured to: send a status monitoring acknowledgement message back to the access node, to enable the access node to send the service request message to an allocation node after receiving the status monitoring acknowledgement message; and send a service request acknowledgement message back to the access node.

In an embodiment, the sending module 740 is further configured to send a status monitoring message to each resource node at a predetermined time interval. The obtaining module 720 is configured to receive a status monitoring acknowledgement message fed back by each resource node, the status monitoring acknowledgement message carrying the work queue status information of the resource node.

In an embodiment, the obtaining module 720 is configured to receive a status monitoring message sent by each access node, the status monitoring message carrying the work queue status information of at least one resource node that is obtained by the access node.

In an embodiment, the obtaining module 720 is configured to: record the work queue status information of each resource node, the work queue status information including a time stamp when the resource node generates the work queue status information; and update, when work queue status information of a resource node is obtained, the recorded work queue status information of the resource node according to an order of the time stamp.

In an embodiment, the work queue status information includes a length of a work queue of a resource node, and the resource allocation module 730 is configured to: determine an idle resource node from the at least one resource node according to the length of the work queue; preset a priority of each service in each access node; and identify at least one idle resource node for each service according to the priority.

In an embodiment, the service request message carries a number of task requests in request queues of J services of an access node, and if a number of task requests of a $j^{th}$ service is $M_j$, where $j=1, \ldots, J$, the resource allocation module 730 is configured to: sequentially poll each service of each access node according to a descending order of the priority, and allocate the $j^{th}$ service to the $M_j$ idle resource nodes, the $j^{th}$ service being a service with a higher priority first obtaining a resource node.

Figure 8:
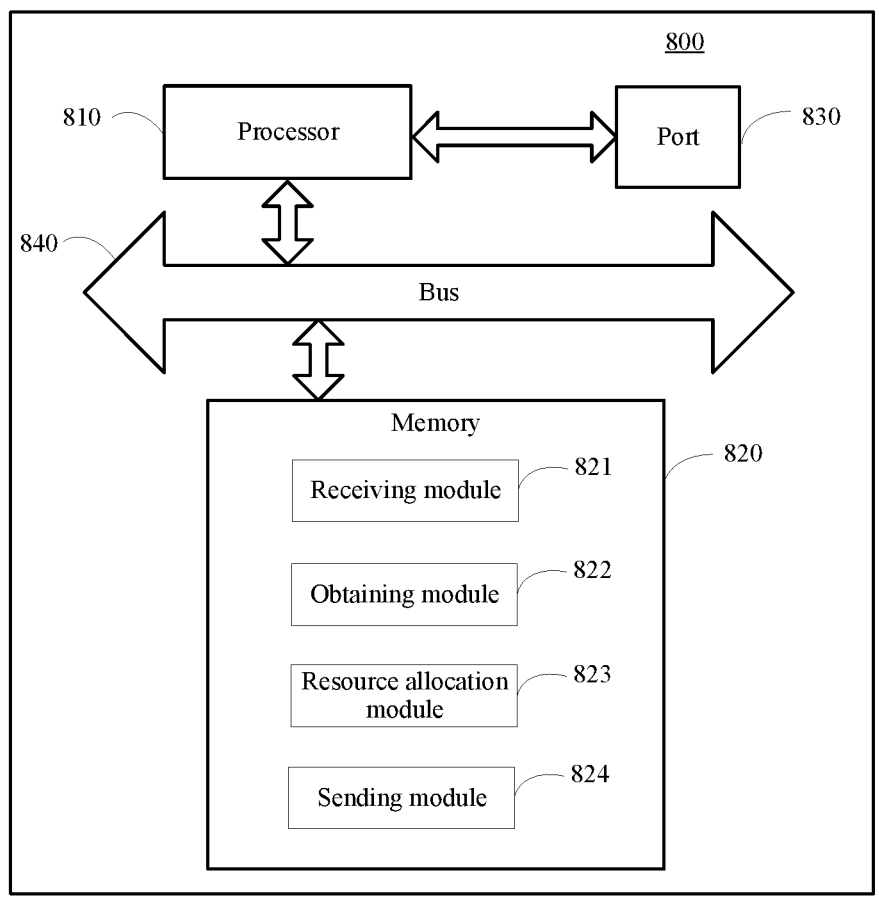
FIG. 8 is a schematic structural diagram of an allocation node according to an embodiment of the present disclosure.

FIG. 8 is a schematic structural diagram of an allocation node according to an embodiment of the present disclosure. The allocation node 800 includes: a processor 810, a memory 820, a port 830, and a bus 840. The processor 810 and the memory 820 are interconnected by using the bus 840. The processor 810 may receive and send data by using the port 830.

The processor 810 is configured to execute machine readable instruction modules stored in the memory 820.

The memory 820 stores the machine-readable instruction modules that can be executed by the processor 810. The instruction modules that can be executed by the processor 810 include: a receiving module 821, an obtaining module 822, a resource allocation module 823, and a sending module 824. When executed by the processor 810, the receiving module 821 may be configured to receive a service request message sent by at least one access node, the service request message from an access node indicating at least one to-be-processed service in the access node. When executed by the processor 810, the obtaining module 822 may be configured to obtain work queue status information of at least one resource node. When executed by the processor 810, the resource allocation module 823 may be configured to: perform, for each access node, resource allocation according to the service request message received by the receiving module 821 and the work queue status information obtained by the obtaining module 822, to identify at least one resource node for each to-be-processed service in the access node and generate an allocation result. When executed by the processor 810, the sending module 824 may be configured to send, for each access node, the allocation result obtained by the resource allocation module 823 to the access node, to enable the access node to send at least one task request to the at least one allocated resource node according to the allocation result.

Further, when the instruction modules stored in the memory 820 are executed by the processor 810, various functions of the receiving module, the obtaining module, the resource allocation module, and the sending module in the foregoing embodiments may be implemented.

Figure 9:
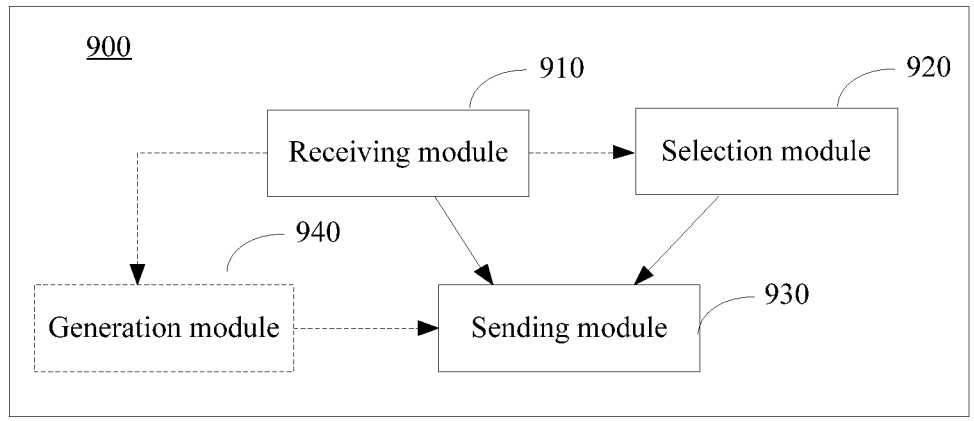
FIG. 9 is a schematic structural diagram of an access node according to an embodiment of the present disclosure.

FIG. 9 is a schematic structural diagram of an access node according to an embodiment of the present disclosure. As shown in FIG. 9, the access node 900 includes: a receiving module 910, a selection module 920, and a sending module 930. The receiving module 910 is configured to receive a task request for at least one to-be-processed service. The selection module 920 is configured to select an allocation node from a group of allocation nodes. The sending module 930 is configured to send a service request message indicating at least one service in the receiving module 910 to the allocation node selected by the selection module 920, to enable the allocation node to perform resource allocation according to the service request message and obtained work queue status information of at least one resource node, so as to identify at least one resource node for each to-be-processed service and generate an allocation result. The receiving module 910 being further configured to receive the allocation result from the allocation node. The sending module 930 being further configured to send at least one task request to the at least one allocated resource node according to the allocation result received by the receiving module 910.

In an embodiment, the sending module 930 is configured to respectively send a status monitoring message to each allocation node at a predetermined time interval. The selection module 920 is configured to: determine, when the receiving module 910 receives a status monitoring acknowledgement message fed back by an allocation node, that the allocation node is online, sort all online allocation nodes based on a time order according to a time point at which the status monitoring acknowledgement message is received, control the sending module 930 to sequentially send the service request message to each online allocation node according to a sorting result, and simultaneously monitor whether the receiving module 910 receives a service request acknowledgement message fed back by the online allocation node; and use, when the receiving module 910 receives the service request acknowledgement message fed back by an online allocation node, the online allocation node as the selected allocation node.

In an embodiment, the access node 900 further includes: a generation module 940, configured to: generate a request queue for each service, and write, whenever the receiving module 910 receives a task request for a service, the task request into the request queue of the service, the service request message carrying several task requests in the request queue of each service.

In an embodiment, the service request message carries a number of task requests in request queues of J services, if a number of task requests of a $j^{th}$ service is $M_j$, where $j=1, \ldots, J$, the allocation result instructs to allocate the $j^{th}$ service to the $M_j$ resource nodes, and the sending module 930 is configured to: take out $M_j$ task requests from the request queue of the $j^{th}$ service that is generated by the generation module 940, and respectively send one task request to each allocated resource node.

In an embodiment, the receiving module 910 is further configured to: receive, before the allocated resource node processes the received task request, a request receiving acknowledgement message carrying the work queue status information of the resource node from the resource node. The sending module 930 is further configured to: send a status monitoring message carrying the work queue status information of each resource node to the allocation node, to enable the allocation node to obtain the work queue status information of the resource node according to the status monitoring message.

In an embodiment, the receiving module 910 is further configured to: receive, after the allocated resource node completes processing the received task request, a request processing acknowledgement message carrying the work queue status information of the resource node from the resource node. The sending module 930 is further configured to: send a status monitoring message carrying the work queue status information of each resource node to the allocation node, to enable the allocation node to obtain the work queue status information of the resource node according to the status monitoring message.

Figure 10:
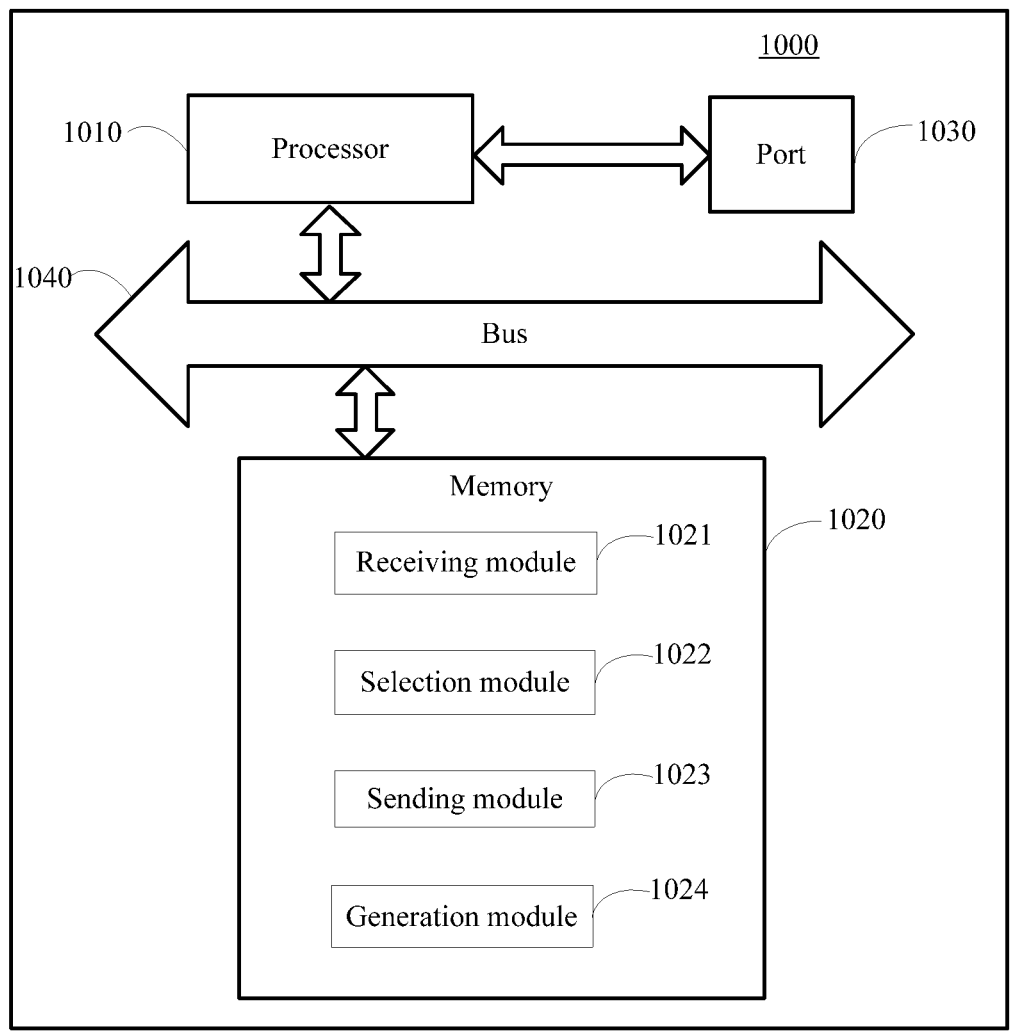
FIG. 10 is a schematic structural diagram of an access node according to an embodiment of the present disclosure.

FIG. 10 is a schematic structural diagram of an access node according to an embodiment of the present disclosure. As shown in FIG. 10, the access node 1000 includes: a processor 1010, a memory 1020, a port 1030, and a bus 1040. The processor 1010 and the memory 1020 are interconnected by using the bus 1040. The processor 1010 can receive and send data by using the port 1030.

The processor 1010 is configured to execute machine readable instruction modules stored in the memory 1020.

The memory 1020 stores the machine-readable instruction modules that can be executed by the processor 1010. The instruction modules that can be executed by the processor 1010 include: a receiving module 1021, a selection module 1022, and a sending module 1023. When being executed by the processor 1010, the receiving module 1021 may be configured to receive a task request for at least one to-be-processed service. When being executed by the processor 1010, the selection module 1022 may be configured to select an allocation node from a group of allocation nodes. When being executed by the processor 1010, the sending module 1023 may be configured to send a service request message indicating at least one service in the receiving module 1021 to the allocation node selected by the selection module 1022, to enable the allocation node to perform resource allocation according to the service request message and obtained work queue status information of at least one resource node, so as to identify at least one resource node for each to-be-processed service and generate an allocation result. When being executed by the processor 1010, the receiving module 1021 being further configured to receive the allocation result from the allocation node. When being executed by the processor 1010, the sending module 1023 being further configured to send at least one task request to the at least one allocated resource node according to the allocation result received by the receiving module 1021.

In an embodiment, the instruction modules that can be executed by the processor 1010 further include a generation module 1024.

When being executed by the processor 1010, the generation module 1024 may be configured to: generate a request queue for each service, and write, whenever the receiving module 1021 receives a task request for a service, the task request into the request queue of the service, the service request message carrying several task requests in the request queue of each service.

In an embodiment, the service request message carries a number of task requests in request queues of J services, if a number of task requests of a $j^{th}$ service is $M_j$, where $j=1, \ldots, J$, the allocation result instructs to identify $M_j$ resource nodes for the $j^{th}$ service, and when being executed by the processor 1010, the sending module 1023 may be configured to: take out $M_j$ task requests from the request queue of the $j^{th}$ service that is generated by the generation module 1024, and respectively send one task request to each allocated resource node.

In embodiments of the present disclosure, a functional module may refer to one or more computer programs stored in the memory 1020 that are executed by the processor 1010. Various functions of the receiving module, the selection module, the sending module, and the generation module in the foregoing embodiments may be implemented by one or more processors executing the computer programs corresponds to each functional module.

Specific methods for implementing the functions by various modules in the foregoing apparatus embodiments are all described in the method embodiments, and details are not described herein again.

In addition, functional modules in the embodiments of this application may be integrated into one processing unit, or each of the modules may exist alone physically, or two or more modules may be integrated into one unit. The integrated unit may be implemented in a form of hardware, or may be implemented in a form of a software function unit.

In addition, each embodiment of the present disclosure may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such a storage medium also constitutes this application. The storage medium may use any type of recording, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, this application further discloses a storage medium, which stores a data processing program. The data processing program is used for executing any embodiment of the foregoing method of this application.

The above descriptions are merely preferred embodiments of this application, but not intended to limit this application. Any modification, equivalent replacement, or improvement made in accordance with the spirit and principle of this application should fall within the protection scope of this application.

What is claimed is:

1. A distributed resource allocation method, the method comprising:
   receiving, by a selected allocation node, a service request message sent by an access node, the service request message from the access node indicating a to-be-processed service in the access node, including:
   sending, by the access node, a status monitoring message to each of a group of allocation nodes, and determining, by the access node, when a status monitoring acknowledgement message sent by an allocation node is received, that the allocation node is online;
   sorting, by the access node, all online allocation nodes based on a time order according to a time point at which the status monitoring acknowledgement message is received, sequentially sending the service request message to each online allocation node according to a sorting result, and monitoring whether a service request acknowledgement message fed back by the online allocation node is received; and identifying, by the access node, when the service request acknowledgement message fed back by an online allocation node is received, the online allocation node as the selected allocation node;

obtaining, by the selected allocation node, work queue status information of a resource node;

allocating, according to the service request message and the work queue status information, the to-be-processed service to the resource node;

receiving allocation, by the access node, of the resource node for the to-be-processed service and generating, by the selected allocation node, an allocation result; and sending, by the selected allocation node, the allocation result to the access node, the access node sending a task request to the resource node according to the allocation result.

2. The method according to claim 1, wherein the status monitoring message includes the work queue status information of the resource node.

3. The method according to claim 1, further comprising:
recording the work queue status information of the resource node to obtain recorded work queue status information, the work queue status information including a time stamp for when the resource node generates the work queue status information; and
updating, when the work queue status information of the resource node is obtained, the recorded work queue status information of the resource node according to the time stamp.

4. The method according to claim 1, wherein the work queue status information includes a length of a work queue, the method further comprising:
setting a priority of each service in the access node; and
identifying an idle resource node for each service according to the priority and the length of the work queue.

5. The method according to claim 4, wherein the service request message carries task requests of J services of the access node, and the task requests of a $j^{th}$ service is Mj, wherein j=1, ..., J, the identifying the idle resource node for each service according to the priority comprises:
sequentially polling each service of each access node according to a descending order of the priority, and identifying Mj idle resource nodes for the $j^{th}$ service.

6. The method according to claim 1, wherein the selected allocation node maintains a service request list according to the service request message, and wherein the service request list includes an access node identifier, a service identifier, and a number of task requests under the service identifier.

7. A distributed resource allocation method, the method comprising:
receiving, by an access node, a task request for a to-be-processed service;
obtaining, by the access node, a selected allocation node from a group of allocation nodes, and sending, by the access node, a service request message indicating the to-be-processed service to the selected allocation node, including:
sending a status monitoring message to each of the group of allocation nodes, and determining, when a status monitoring acknowledgement message sent by an allocation node is received, that the allocation node is online;
sorting all online allocation nodes based on a time order according to a time point at which the status monitoring acknowledgement message is received, sequentially sending the service request message to each online allocation node according to a sorting result, and monitoring whether a service request acknowledgement message fed back by the online allocation node is received; and
identifying, when the service request acknowledgement message fed back by an online allocation node is received, the online allocation node as the selected allocation node;
receiving, by the access node, an allocation result from the selected allocation node, the allocation result indicating a resource node identified by the selected allocation node for the to-be-processed service according to the service request message and work queue status information of the resource node; and
sending the task request to the resource node according to the allocation result.

8. The method according to claim 7, further comprising:
generating a request queue for each service; and
writing the task request into the request queue.

9. The method according to claim 8, wherein the service request message carries a number of task requests of J services, a number of task requests of a $j^{th}$ service is referred to as Mj, wherein j=1, ..., J, the allocation result indicates sending Mj to resource nodes for the $j^{th}$ service, and the sending the task request to the resource node according to the allocation result comprises:
identifying Mj task requests from the request queue of the $j^{th}$ service, and sending one task request to the resource node.

10. The method according to of claim 7, further comprising:
receiving, before the resource node processes the task request, a request receiving acknowledgement message carrying the work queue status information of the resource node from the resource node; and
sending a status monitoring message carrying the work queue status information of each the resource node to the selected allocation node, the selected allocation node obtaining the work queue status information of the resource node according to the status monitoring message.

11. The method according to claim 7, further comprising:
receiving, after the resource node completes processing the task request, a request processing acknowledgement message carrying the work queue status information of the resource node from the resource node; and
sending a status monitoring message carrying the work queue status information of the resource node to the selected allocation node, to enable the selected allocation node to obtain the work queue status information of the allocated resource node according to the status monitoring message.

12. The method according to claim 7, wherein the selected allocation node maintains a service request list according to the service request message, and wherein the service request list includes an access node identifier, a service identifier, and a number of task requests under the service identifier.

13. A resource allocation node, comprising a processor and a memory, the memory storing instructions, and when executing the instructions, the processor being configured to:
receive a service request message from an access node indicating a to-be-processed service in the access node, including:

sending, by the access node, a status monitoring message to each of a group of allocation nodes, and determining, by the access node, when a status monitoring acknowledgement message sent by an allocation node is received, that the allocation node is online;

sorting, by the access node, all online allocation nodes based on a time order according to a time point at which the status monitoring acknowledgement message is received, sequentially sending the service request message to each online allocation node according to a sorting result, and monitoring whether a service request acknowledgement message fed back by the online allocation node is received; and identifying, by the access node, when the service request acknowledgement message fed back by an online allocation node is received, the online allocation node as the selected allocation node;

obtain work queue status information of the resource node;

generate an allocation result based on resource allocation according to the service request message and the work queue status information; and send the allocation result to the access node, the access node sending a task request to the resource node according to the allocation result.

14. The allocation node according to claim 13, wherein the status monitoring message includes the work queue status information.

15. The allocation node according to claim 13, wherein when executing the instructions, the processor is further configured to:

record the work queue status information of the resource node to obtain recorded work queue status information, the work queue status information including a time stamp indicating when the resource node generates the work queue status information; and update, when the work queue status information of the resource node is obtained, the recorded work queue status information of the resource node according to the time stamp.

16. The allocation node according to claim 13, the work queue status information includes a length of a work queue, and when executing the instructions, the processor is further configured to:

set a priority of each service in the access node; and identify an idle resource node for each service according to the priority and the length of the work queue.

17. The allocation node according to claim 13, wherein the selected allocation node maintains a service request list according to the service request message, and wherein the service request list includes an access node identifier, a service identifier, and a number of task requests under the service identifier.

* * * * *